United States Patent
Li

(10) Patent No.: US 7,155,036 B2
(45) Date of Patent: Dec. 26, 2006

(54) FACE DETECTION UNDER VARYING ROTATION

(75) Inventor: Pingshan Li, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 997 days.

(21) Appl. No.: 09/789,781

(22) Filed: Feb. 21, 2001

(65) Prior Publication Data

US 2002/0150280 A1 Oct. 17, 2002

Related U.S. Application Data

(60) Provisional application No. 60/251,081, filed on Dec. 4, 2000.

(51) Int. Cl.
*G06K 9/00* (2006.01)
*G06K 9/48* (2006.01)

(52) U.S. Cl. ...................................... 382/118; 382/199

(58) Field of Classification Search .............. 382/115, 382/117, 181, 190, 199, 200, 206, 260, 263, 382/264, 266, 118; 351/204; 283/68; 340/5.52, 340/5.53, 5.82, 5.83; 356/71
See application file for complete search history.

(56) References Cited

U.S. PATENT DOCUMENTS

| | | | | |
|---|---|---|---|---|
| 5,680,481 A | * | 10/1997 | Prasad et al. ............... | 382/190 |
| 5,781,650 A | | 7/1998 | Lobo et al. ................. | 382/118 |
| 5,832,115 A | * | 11/1998 | Rosenberg .................. | 382/199 |
| 5,835,616 A | | 11/1998 | Lobo et al. ................. | 382/118 |
| 5,852,669 A | * | 12/1998 | Eleftheriadis et al. ...... | 382/118 |
| 6,072,893 A | * | 6/2000 | Luo et al. ................... | 382/117 |
| 6,456,328 B1 | * | 9/2002 | Okada ........................ | 348/699 |
| 6,526,161 B1 | * | 2/2003 | Yan ............................ | 328/118 |
| 6,633,655 B1 | * | 10/2003 | Hong et al. ................. | 382/118 |

OTHER PUBLICATIONS

Brunelli et al., "Face Recognition: Features versus Templates," IEEE 1993, pp. 1042-1052.*
Nugroho et al., "Detecting Human Face From Monocular Image Sequences by Genetic Algorithms," IEEE 1997, pp. 2533-2536.*
Yang et al., "Parallel Implementation on DSPs of a Face Detection Algorithm," Proceedings of ICSP 1998, pp. 69-72.*

(Continued)

*Primary Examiner*—Samir Ahmed
(74) *Attorney, Agent, or Firm*—Miller Patent Services; Jerry A. Miller

(57) ABSTRACT

A feature based face recognition method and apparatus. Global amplitude and direction is calculated for regions defined by a sliding window over an input gray scale image. These values are low pass filtered and a search is carried out for candidates for an eye. Once an eye candidate is identified by comparing the amplitude with a threshold, the other eye is presumed to be located a fixed distance away at the angle of the eye. The mouth is then determined to be in a predetermined location perpendicular to the angle of the eyes. A face contour is estimated by defining two ellipses between which face contours having angles similar to the ellipse are found. Multiple detections are possible and those detections are merged by averaging. The image is resized and the process repeats until the image has been reduced to its minimum size.

53 Claims, 14 Drawing Sheets

OTHER PUBLICATIONS

Saber et al., "Face Detection and Facial Feature Extraction Using Color, Shape and Symmetry-Based Cost Functions," IEEE 1996, pp. 654-658.*

U.S. Appl. No. 09/585,980, filed Jun. 2, 2000, Wang.

"Automatic Human Face Recognition", Xing, et al., May 2000, ISO/IEC JTC1/SC29/WG11 Proposal, pp. 1-10.

"Face Recognition for Smart Environments", Pentland et al., Computer, Feb. 2000, pp. 50-55.

"Enhancing the Bayesian Network Approach to Face Detection", Coelho et al., IEEE document No. 0-7695-0296-2/99, pp. 150-159, 1999.

"Neural Network-Based Face Detection", Rowley et al., IEEE Trans. On Pattern Analysis and Machine Intelligence, vol. 20, No. 1, pp. 23-38, Jan. 1998.

"Rotation Invariant Neural Network-Based Face Detection", Rowley et al., IEEE document No. 0-8186-8497-6/98, pp. 38-44, 1998.

"Modeling Facial Colour and Identity with Gaussian Mixtures", McKenna et al., Pattern Recognition, vol. 31, No. 12, pp. 1883-1892, 1998.

"Example-Based Learning for View-Based Human Face Detection", Sung et al., IEEE Trans. On Pattern Analysis and Machine Intelligence, vol. 20 No. 1, Jan. 1998.

"Detection of Human Faces under Scale, Orientation and Viewpoint Variations", Yow et al., IEEE document No. 0-8186-7713-9/96, pp. 295-300, 1996.

"Face Texture Model Based on SGLD and Its Application in Face Detection in a Color Scene", Dai et al., Pattern Recognition, vol. 29, No. 6, pp. 1007-1017, 1996.

"Feature Extraction from Faces Using Deformable Templates", Yuille et al., International Journal of Computer Vision, 8:2, pp. 99-111, 1992.

* cited by examiner

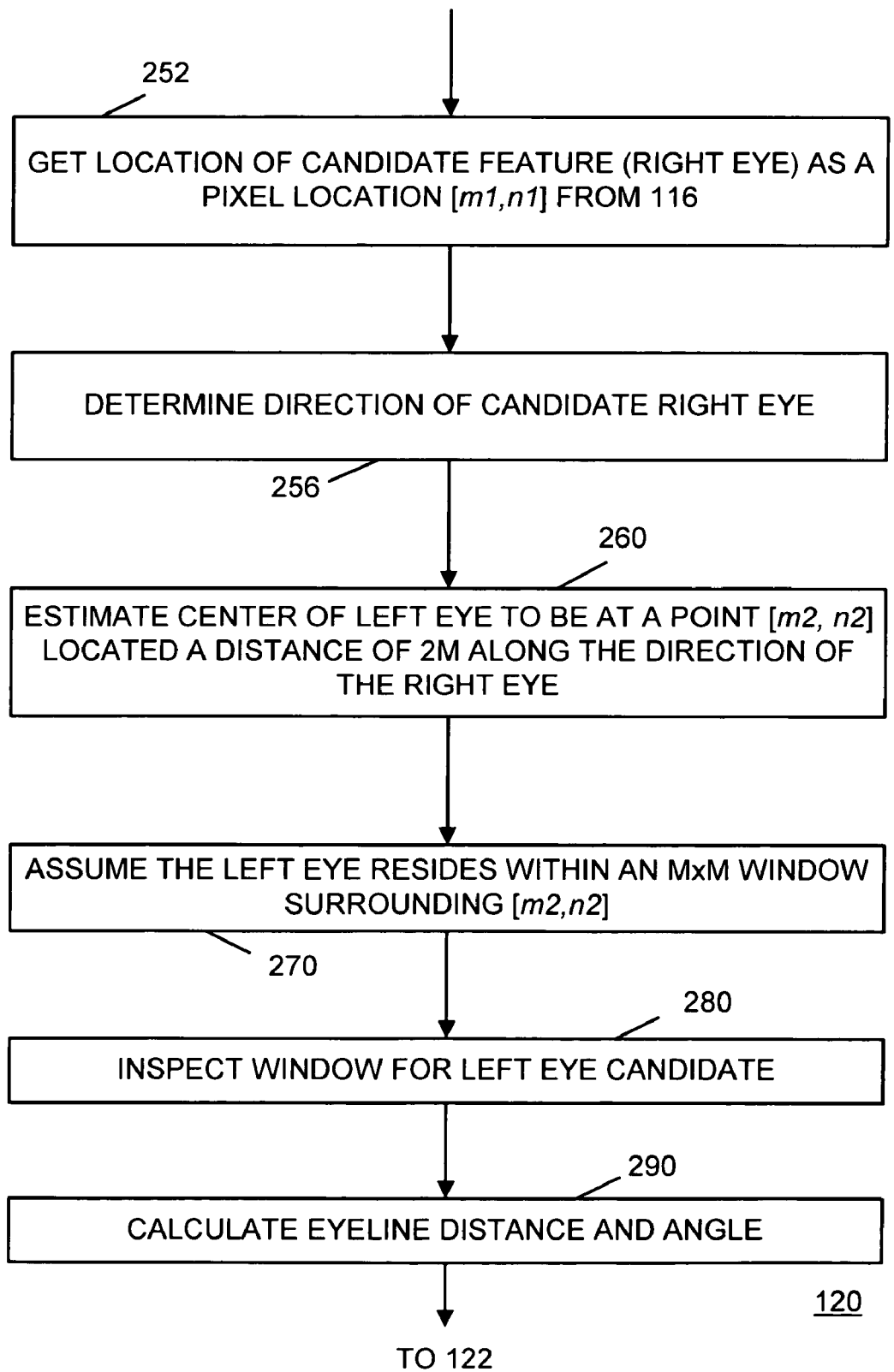

FIG. 7

134      FROM 130

450 → CONSTRUCT INNER ELLIPSE FOR LOWER PORTION OF FACE (BELOW EYELINE) CENTERED AT (Xc,Yc) WITH A VERTEX LOCATED AT THE MOUTH DISTANCE ALONG THE LINE PERPENDICULAR TO THE EYELINE PASSING THROUGH THE MOUTH, AND WITH COVERTICES LOCATED ALONG THE DIRECTION OF THE EYELINE AT A DISTANCE OF 1/2 THE EYE DISTANCE FROM (Xc,Yc)

458 → CONSTRUCT OUTER ELLIPSE FOR LOWER PORTION OF FACE (BELOW EYELINE) CENTERED AT (Xc,Yc) WITH A VERTEX LOCATED AT 1.5 TIMES THE MOUTH DISTANCE ALONG THE LINE PERPENDICULAR TO THE EYELINE PASSING THROUGH THE MOUTH, AND WITH COVERTICES LOCATED ALONG THE DIRECTION OF THE EYELINE AT A DISTANCE OF THE EYE DISTANCE FROM (Xc,Yc)

466 — SET THETA = 0, COUNT = 0

472 — FOR THE ANGLE = THE EYELINE ANGLE + THETA, DETERMINE IF A POINT RESIDES ALONG A LINE CONSRUCTED FROM (Xc,Yc) TO THE OUTER ELLIPSE WHICH IS GREATER IN AMPLITUDE THAN A THRESHOLD AND HAS A TANGENT ANGLE LESS THAN 30 DEGREES DIFFERENT FROM THE TANGENT ANGLES OF BOTH ELLIPSES AT THE POINT OF INTERSECTION OF THE ELLIPSES AND THE CONSTRUCTED LINE

478 POINT FOUND? — YES → 486 INCREMENT COUNT= # POINTS FOUND

NO ↓

492 THETA=180? — NO → 496 INCREMENT THETA

YES ↓

TO 138

FACE DETECTION UNDER VARYING ROTATION

CROSS REFERENCE TO RELATED DOCUMENTS

This application is related to and claims priority of U.S. Provisional patent application Ser. No. 60/251,081 to Pingshan Li, filed Dec. 4, 2000 entitled "Face Detection Under Varying Rotation" which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it ah appears in the Patent and Trademark Office patent file or records, but otherwise reserves all copyright rights whatsoever.

FIELD OF THE INVENTION

This invention relates generally to the field of image analysis. More particularly, this invention relates to a method and apparatus for detection of a face within a digitized photographic image. The invention provides a method and apparatus that detects faces with varying scales and rotations.

BACKGROUND OF THE INVENTION

The basic purpose of face detection is to identify whether and where human faces occur in an given image. Face detection is generally considered the first step of an automatic human face recognition system. But, face detection also has numerous other applications including surveillance systems and photo ID database searching. Face detection alone can also be used for applications such as automatic photo retouching. Many other uses are also possible. Known face detection techniques can generally be categorized in three categories: template-based systems, feature-based systems and color-based systems.

Template-based systems use face templates to match every possible location of the given image. The matching techniques include neural network and distribution-based face model matching. These methods locate the face based on intensity information. Hausdorff distance matching detects the faces based on edge information. These methods inherently become unreliable for different head orientation and scale. Most of them can only detect vertical and front view faces. Faces with different angles and orientations are often detected using different templates. Faces with different scales can be detected by applying the same algorithm on the gradually resized images. Unfortunately, these methods can be very time consuming.

Feature-based systems extract the potential facial features from the image, then detect the faces based on the relative positions of the features. These methods can detect the faces with wide range of lighting conditions and head orientations. However, known previous work only deals with detection of vertical faces.

Color-based systems detect a human face based on a histogram of the skin color. The detection rate can be low when presented in different lighting conditions and color background. Color based methods are often used in pre-filtering stage before applying other methods.

SUMMARY OF THE INVENTION

The present invention relates generally to face recognition. Objects, advantages and features of the invention will become apparent to those skilled in the art upon consideration of the following detailed description of the invention.

In certain embodiments of the invention, a feature based face recognition method and apparatus is provided. Global amplitude and direction is calculated for regions defined by a sliding window over an input gray scale image. These values are low pass filtered and a search is carried out for candidates for an eye. Once an eye candidate is identified by comparing the amplitude with a threshold, the other eye is presumed to be located a fixed distance away at the angle of the eye. The mouth is then determined to be in a predetermined location perpendicular to the angle of the eyes. A face contour is estimated by defining two ellipses between which face contours having angles similar to the ellipse are found. Multiple detections are possible and those detections are merged by averaging. The image is resized and the process repeats until the image has been reduced to its minimum size.

In one embodiment consistent with the present invention, a method of detecting a face in a matrix of pixels representing an image includes: computing a vector having amplitude and direction for each of a plurality of sub-matrices, the sub-matrices having size estimated to be a facial feature size in the image; inspecting each sub-matrix to determine if the amplitude exceeds a threshold, wherein sub-matrices having amplitude exceeding the threshold are deemed facial feature candidate sub-matrices; establishing distance and angle criteria for relationships among candidate sub-matrices that match facial features; and identifying sets of candidate sub-matrices matching the distance and angle criteria to detect the presence of a face in the image.

An electronic storage medium consistent with the present invention stores instructions which, when executed on a programmed processor, carry out a method of detecting a face in a matrix of pixels representing an image, the method including: computing a vector having amplitude and direction for each of a plurality of sub-matrices, the sub-matrices having size estimated to be a facial feature size in the image; inspecting each sub-matrix to determine if the amplitude exceeds a threshold, wherein sub-matrices having amplitude exceeding the threshold are deemed facial feature candidate sub-matrices; establishing distance and angle criteria for relationships among candidate sub-matrices that match facial features; and identifying sets of candidate sub-matrices matching the distance and angle criteria to detect the presence of a face in the image.

A face detection apparatus for detecting a face in a matrix of pixels representing an image consistent with an embodiment of the invention has an input that receives an input image. A programmed processor carries out a process of: computing a vector having amplitude and direction for each of a plurality of sub-matrices, the sub-matrices having size estimated to be a facial feature size in the image; inspecting each sub-matrix to determine if the amplitude exceeds a threshold, wherein sub-matrices having amplitude exceeding the threshold are deemed facial feature candidate sub-matrices; establishing distance and angle criteria for relationships among candidate sub-matrices that match facial features; and identifying sets of candidate sub-matrices matching the distance and angle criteria to detect the presence of a face in the image.

A method of face detection in an image according to another embodiment consistent with the present image, includes identifying a first candidate facial feature with a feature size; computing a first direction associated with the first candidate facial; and searching for a second candidate facial feature at a first location determined in part by the first direction.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 3 is a flow chart of an eye search process consistent with an embodiment of the invention.

FIG. 7 is a flow chart of a face contour location process consistent with an embodiment of the present invention.

DETAILED DESCRIPTION OF THE INVENTION

Figure 1:
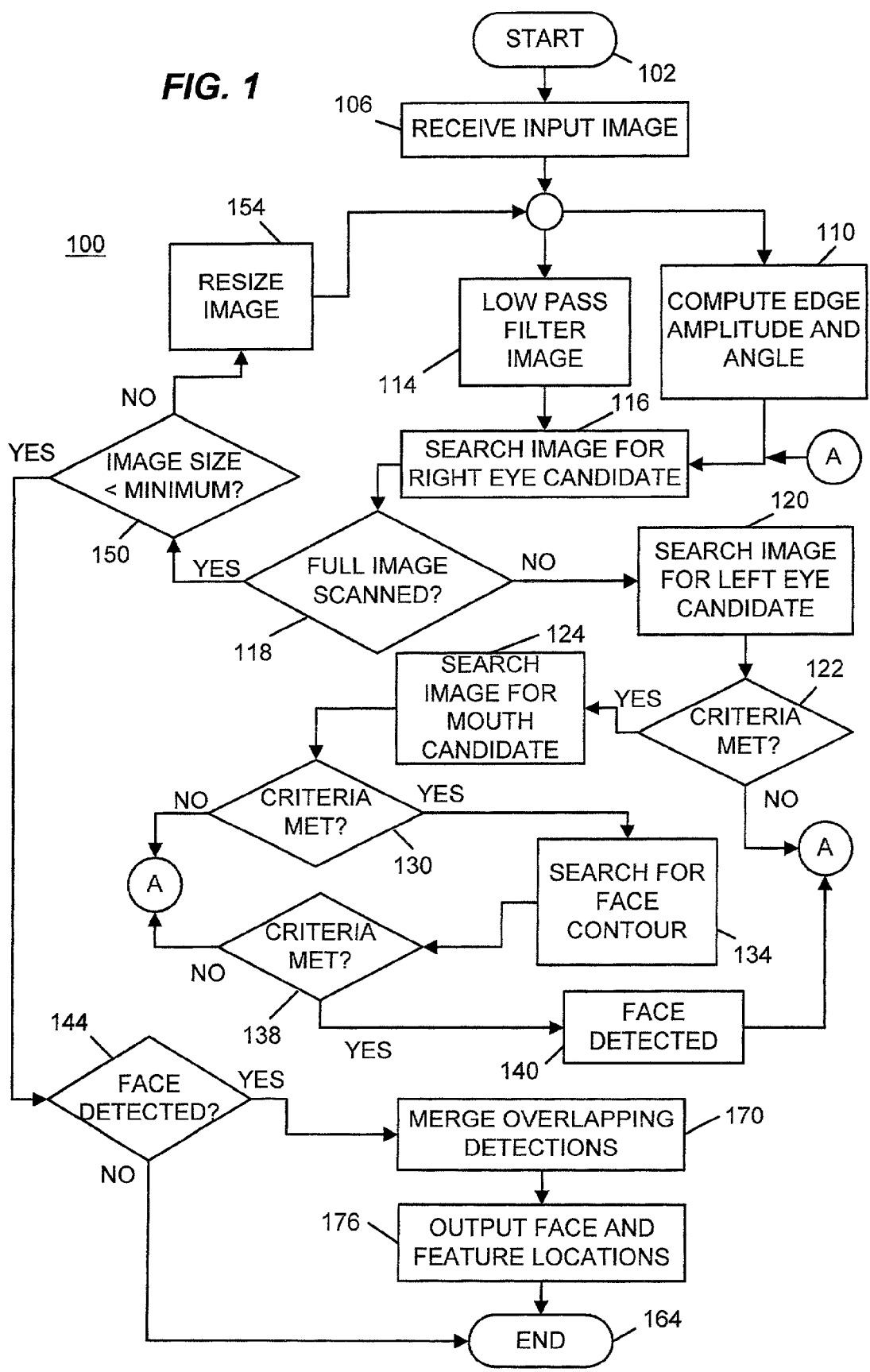
FIG. 1 is a flow chart of a face detection process consistent with embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Referring now to FIG. 1, a flow chart 100 describing the overall face detection process of the present invention starts at 102. At 106 an input image is received. This input image is, in general, represented by a matrix of m vertical pixels by n horizontal pixels. The input image can be either a color image or a gray scale image. However, the present invention utilizes only a gray scale image. Therefore, if the input image is a color image it is converted to a gray scale image by considering only the luminance component of the image, or by use of any other suitable conversion method. Without loss of generality, it can be assumed that the image has 256 grey levels. Once the input image is an appropriate gray scale image, the process computes an edge amplitude and angle matrix for the image at 110. This is accomplished by ascertaining an amplitude and angle component for each of the plurality of moving windows of a particular size that are sub-matrices of the input image matrix. The detailed process for accomplishing this will be described in greater detail in connection with FIG. 2. However, for now it is adequate to understand that each small region of the image is associated with a magnitude and direction. The input image is low pass filtered at 114 using any suitable low pass filtering technique, such as averaging.

The present invention utilizes a feature recognition mechanism for detecting the face in an image and starts, in this embodiment, with a search for a right eye candidate within the image at 116. Other features are subsequently searched for (with geometric relationships with the eye candidates guiding the search). The order of searching for particular features can be varied without departing from the present invention. A plurality of candidates may be identified in process 100 for the feature being sought (in this case eyes). When a first (or subsequent) eye candidate is found at 116 the process proceeds to 120 where the left eye is sought. If no eye candidate is found at 116 (that is, once the entire image has been scanned at 118 in search of eye candidates), the process proceeds to 150 as will be discussed later. At 122, the pair of candidate eyes is compared to a set of criteria that has been established to determine that, in fact, the features should remain a candidates for eyes. If they do not meet the criteria, control returns to 116 where the next right eye candidate is identified and the process repeats. In general, those criteria will include amplitude comparisons and angle comparisons for the vectors associated with regions of the image containing the eyes. The low pass filtering carried out at 114 tends to minimize the noise associated with the search carried out in 116 and 120 thereby reducing the number of candidates for eyes identified in 116 and 120.

It has been found that the eyes and the mouth will often represent some of the darkest areas of the face. Therefore, amplitudes having lower values of luminance on the average for a particular region are potential candidates for eyes. Moreover, once a candidate region has been identified, if it is to remain a candidate for an eye, there should generally be another eye located a comparatively predictable distance from the first eye. Moreover, the direction associated with the region containing the eye should point toward the other eye and the difference in the direction associated with two regions containing eyes should be similar (for example, less than about 15° difference in the direction). By examination of the angle, faces in varying degrees of rotation can be detected.

When the current eye candidates have been determined to meet the appropriate criteria for remaining a candidate for eyes at 122, the process proceeds to 124 where a search proceeds for a mouth candidate associated with the eyes. The mouth is also generally one of the darker regions of a face and therefore has a low value of luminance. Moreover, a region containing a mouth will have a direction associated with it which is approximately parallel to the direction of the eyeline (for example, within approximately 10°). Moreover, the mouth is predictably situated in a position that is centered between the two eyes and below the eyes approximately 1.5 times the distance between the two eyes. Thus, any candidate for a mouth should meet certain criteria including an amplitude criteria, a direction criteria and a location criteria with respect to the eyes at 130. Again, consideration of a relative direction for the mouth enables the present process to detect faces in varying degrees of rotation.

If the criteria are met for eyes and for mouth at 130, the process proceeds to 134 where a face contour is estimated for the face candidate identified by the presence of a mouth and two eyes meeting the required criteria. If not, control returns to 116 where the next right eye candidate is sought.

According to the present embodiment, the face contour can be approximated by a geometric construct surrounding the eye and mouth locations with position and characteristics determined from the eye and mouth locations. In particular, the present invention utilizes a pair of ellipses to estimate a possible location for face contour. Two ellipses are constructed which define boundaries within which the face contour should reside if a face has been detected. Both ellipses utilize the central point between the eyes as the center of the ellipse. The inner ellipse has a vertex located approximately at the mouth and covertices located approximately at the eyes. An outer ellipse is constructed using the central point between the eyes as the center, a vertex located approximately 1.5 times the distance between the center of the eyes (perpendicular to the eyeline) and the mouth and covertices located at about 2 times the distance between the eyes along the eyeline from the point defining the center of the eyeline.

It is noted that a face contour can be predictably expected to fall between these two ellipses, and that a face contour can be roughly approximated in shape by an ellipse. But, the face contour is only predictably between the two ellipses for the lower half of the face appearing in the image. Because of different hair styles, presence or lack of hair, hats, etc., the upper half of the face is difficult to predictably define and is therefore not used.

In order to estimate the face contours at 134, for each candidate face a line is constructed from the center of the ellipses to the outer ellipse starting at the angle of the eyeline and sweeping around the lower half of the possible face image by 180 degrees in small increments (for example, 1 degree increments). If a face is being detected, a face contour edge will intersect the line as it is swept through the 180 degrees. The value of the feature amplitude map at the location of a point on the face edge contour should have a magnitude greater than a predetermined threshold and have a detectable angle approximating that of the two ellipses. The difference between the face contour angle and the angle of each ellipse will, therefore, be comparatively small (for example, less than about 30 degrees). If a threshold number of points satisfying this requirement is met at 138, then a face contour can be considered to have been detected at 140. Whether or not a face has been detected, control returns to 116 to search for the next right eye candidate.

When the image has been fully scanned and no additional right eye candidate is identified at 118, then the size of the image is adjusted and the process repeated. But, first the image is inspected at 150 to determine if the image has previously been minimized to a size that cannot be further inspected. If the image size is not at the minimum at 150, the image is resized at 154. In the preferred embodiment, this is accomplished by reducing the number of pixels by half in each direction (resulting in an image ¼ the original size in pixels). In the preferred embodiment, the sub-matrices are defined to be 10 by 10 pixel windows and once the image size has been reduced to 20 by 20 pixels or less it is determined that no further face detection is possible. Thus, at 150 if the image size is less than the minimum detectable image (e.g., 20×20), control passes to 144. If no face is deemed to have been detected at 144 (perhaps leading to an error message or other process function), the process terminates at 164. This resizing operation is carried out without regard for whether or not a face image has been detected in order to enhance the likelihood of detecting multiple faces of differing sizes and rotations in an image.

A feature size is initially estimated to be approximately M×M pixels in the present invention. If the candidate features do not meet the criteria required to result in a face detection, resizing the image effectively revises this estimated feature size in relation to the overall image size. This enables the current invention to detect faces of varying scales.

If at 138 all criteria are met for at least one face detection, control passes to 170 where overlapping detections are identified. An overlapping detection, for purposes of this document, means that two regions potentially containing a face feature share at least one sub-matrix element. If any such regions are identified at 170, they are assumed to be the same identification of a feature. Thus, the feature can be most accurately characterized as appearing at some average location associated with the plurality of detections. In the present embodiment, the locations are defined by 10×10 (M×M) sub-matrices, which are centered at a particular point. These sub-matrices are merged by simple averaging (or any other suitable technique similar to averaging) to determine where the center (or centroid) of the matrices reside. That average location is then considered to be the face feature location or locations. At 176 the face location is output in any desired manner depending upon the application for the face detection and the process ends at 164. The face location can be characterized by the location of the dominant features of the face (eyes, mouth and face edge contour) or can be further characterized by defining a geometric region (a square, circle ellipse, etc.) containing all of the identified face features. Such geometric constructs can be created using the location of the facial features as reference points for constructing the geometric region desired.

Figure 2:
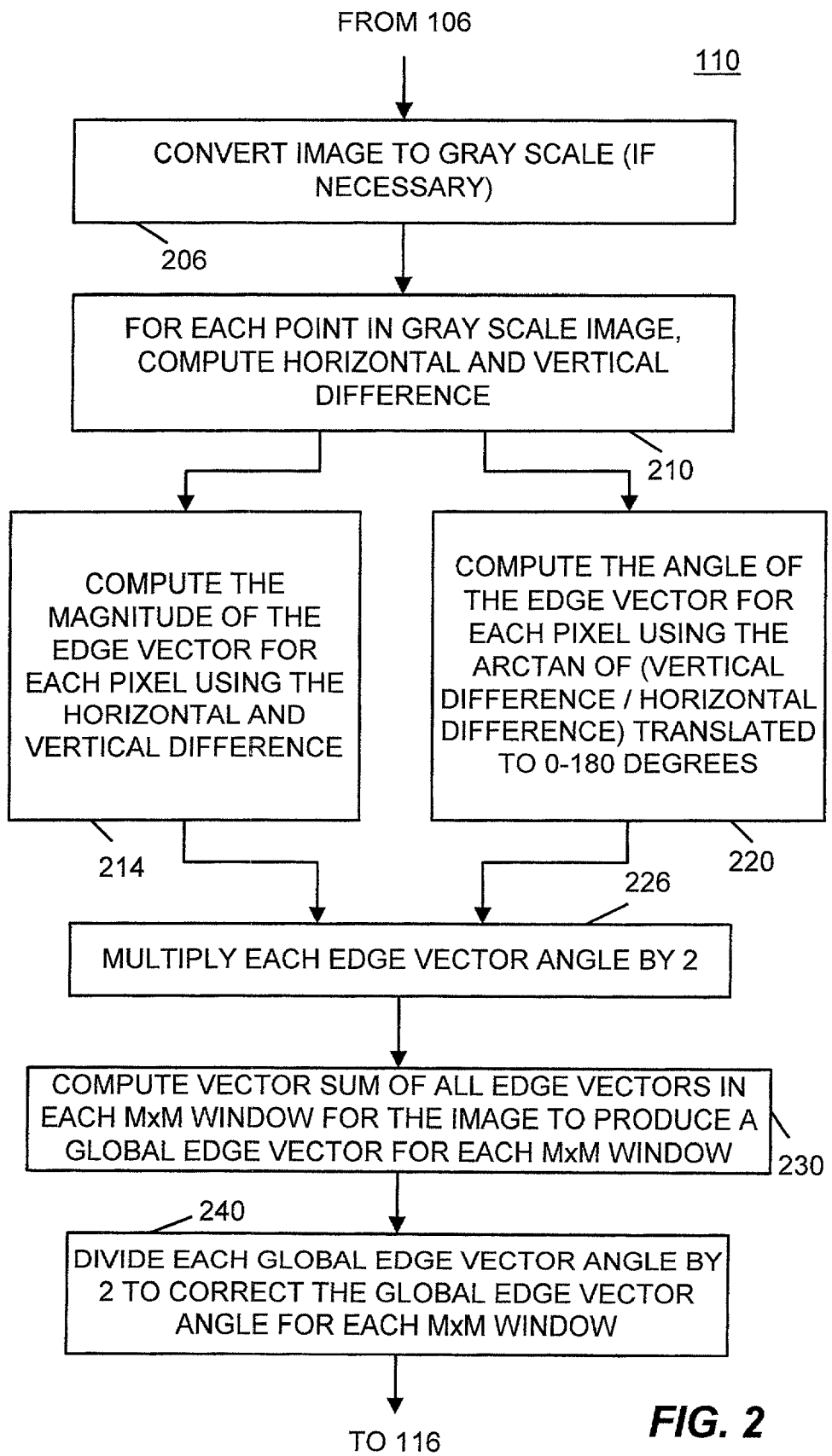
FIG. 2 is a flow chart of a process for computing edge amplitude and angles consistent with an embodiment of the present invention.

While FIG. 1 provides an overview of the process, the computation of the edge amplitude and angle at 110 is defined in greater detail in FIG. 2. In addition, the search for eyes is characterized in greater detail in connection with FIGS. 3 and 4. The search for the mouth at 124 described in greater detail in connection with FIGS. 5 and 6. The estimation of the face contour at 134 is described in greater detail in connection with FIG. 7 and FIG. 8 and the merging of overlapping detections is described in greater detail in connection with FIG. 9.

Referring now to FIG. 2, the edge amplitude and angle computation at 110 is described in greater detail. At 206, the image is converted to a gray scale image or the luminance component alone is considered if the initial image is a color image. If the initial image is gray scale, no conversion is necessary. For each point in the gray scale image, a horizontal and vertical difference component is computed at 210. This computation is carried out as follows:

Suppose f[m,n] is the input gray scale image. The horizontal difference of f[m,n] is given by:

$$I_x[m,n]=f[m,n+1]-f[m,n] \quad (1)$$

The vertical difference of f[m,n] is given by:

$$I_y[m,n]=f[m+1,n]-f[m,n] \quad (2)$$

Once the horizontal and vertical difference is computed at 210, the magnitude of the edge vector for each pixel using the horizontal and vertical difference is computed at 214 and the angle of the edge vector for each pixel is computed using the arctan of the vertical difference divided by the horizontal difference translated from 0–180 degrees at 220. Mathematically, these functions are carried out as follows:

The magnitude and the angle of the gradient at [m,n] can be estimated by:

$$|v|=|I_x|+|I_y| \quad (3)$$

The slope of the edge is generally perpendicular to the gradient. The angle that represents the slope of the edge information is computed as:

$$v=I_x i+I_y j \quad (4)$$

Expression (4) is implemented as:

$$|v|=|I_x|+|I_y|=\text{the amplitude of the edge, and} \quad (5)$$

$$Lv = \arctan\left(\frac{I_x}{I_y}\right) \text{ translated to } 0\text{–}180° = \text{the angle of the edge.} \quad (6)$$

In order to calculate the average slope of multiple lines, suppose there exists a set of vectors:

$$V=\{v_1, v_2, \ldots, v_n\} \quad (7)$$

It is now desired to find a global vector s of V. Because the angle of a line θ is equivalent to 180°−θ, the vector $$s = \sum_{v_i \in V} v_i \quad (8)$$

does not reflect the average angle of V. Based on this consideration, define a set of new vectors by multiplying the angle of each of the vectors in V by 2 at 226:

$$\overline{V}=\{\overline{v}_1, \overline{v}_2, \ldots, \overline{v}_n\} \quad (9)$$

where $$\angle\overline{v}_i=2\angle v_i, \forall v_i \in V \quad (10)$$

At 230, the sum of all edge vectors in each of the sub-matrices (the M×M window) is computed to produce a global edge vector for each sub-matrix. Thus The sum of $\overline{V}$ is given by:

$$\overline{s} = \sum_{\overline{v}_i \in \overline{V}} \overline{v}_i \quad (11)$$

At 240, each global edge vector angle is divided by 2 to correct the global edge vector angle for each M×M window. Thus, the global vector V is denoted by:

$$s=G(V) \quad (12)$$

is given by dividing the angle of $\overline{s}$ by 2:

$$|s|=|\overline{s}| \quad (13)$$

$$Ls = \frac{L\overline{s}}{2} \quad (14)$$

Now, consider an input grayscale image f[m,n]. First estimate the size of the feature to be M×M pixels. The feature amplitude map is given by:

$$A[m,n]=G(v_{M \times M}[m,n]) \quad (15)$$

where $(v_{M \times M}[m,n])$ is the M×M submatrix of v starting at [m,n].

During the course of this discussion, the difference between 2 angles will periodically be computed. To assure that there is no confusion in what is meant by computing the difference between 2 angles, define the difference between two angles is equivalent to the difference between two lines. Suppose $\theta_1$ and $\theta_2$ are the angles of two lines, respectively. Then the difference between $\theta_1$ and $\theta_2$ is defined by:

$$D(\theta_1,\theta_2)=\min\{|\theta_1-\theta_2|, 180°-|\theta_1-\theta_2|\} \quad (16)$$

Once the computations of 110 are completed, the process returns the computed values to 116. A low pass filter at 114 is applied to the input image to obtain an output image G[m,n]. The value of G[m,n] is the average of the M×M submatrix of f[m,n] and is also applied to 116. Specifically, suppose the low pass filter is represented by an M×M matrix L[m,n] with L[m,n]=1/M² for all m,n, then:

$$G[m,n]=f[m,n]**L[m,n] \quad (17)$$

Referring now to FIG. 3, the process of searching for left eye candidates, shown as 120 of FIG. 1, is explained in greater detail. The process of FIG. 3 is carried out for each right eye candidate identified. At 252, the location $[m_1,n_1]$ of the candidate right eye is retrieved (as determined by the feature amplitude exceeding a particular threshold in 116). In this case, which is not to be limiting, the feature is assumed to be a candidate for a right eye at 116 and is identified by having a feature amplitude of at least a predetermined threshold value. In the preferred embodiment, a feature amplitude value of greater than 5 on a scale of 0 to 255 was used as the threshold, but this is not to be limiting. Other ranges, for example less than 5 to 20 could be expected to yield similar results. Thus, a right eye candidate is at a location with a feature amplitude value greater than 5, in the preferred embodiment.

Once a candidate for the right eye is identified at 252, the direction of the eye can be determined at 256. At 260, the left eye is estimated to be situated along the direction of the candidate right eye at a point centered on location $[m_c,n_c]$ at a predetermined distance of the direction of the candidate right eye. In the present embodiment, the size of the feature is assumed to be approximately M'M pixels (the size of the sub-matrix, e.g., 10×10—the estimated size of the feature to be recognized) and the other eye is presumed to be 2M away from the first eye in the direction of the first eye. Thus, at 270, it can be assumed that the left eye resides within an M×M window surrounding location $[m_c,n_c]$. At 280 the image can be inspected for candidates meeting this criteria. All candidates that meet the criteria for being a pair of eyes are identified in this manner. Once the second eye is located, the eyeline length L and direction can be computed to refine the estimate of the distance between the eyes over the initial estimate of 2M at 290.

Figure 4:
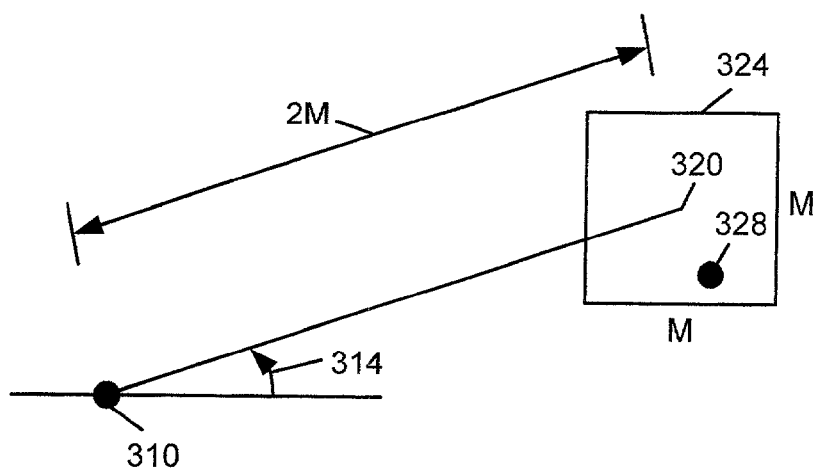
FIG. 4 illustrates the eye search process of FIG. 3 graphically.

The process just described is illustrated as 300 in FIG. 4 (not to scale) where a right eye candidate 310 is first identified. The candidate eye location 310 has a direction associated with it indicated by angle 314. The left eye is estimated to be situated at a location 2×M away from the right eye candidate at $[m_c,n_c]$ shown as 320 within a sub-matrix 324 having size M×M. In this case, we see that the location is actually at 328, which does reside within the M×M sub-matrix. Once the second eye is located, the eyeline length and direction can be refined as the distance between 310 and 328 and the direction of the line connection 310 and 328.

In mathematical terms, eye Location can be accomplished as follows. If the value feature amplitude map at some location $[m_1,n_1]$ exceeds a specified threshold, it is considered a candidate for a feature. Let us assume that this is a right eye. Suppose that the feature amplitude at right eye location $[m_1,n_1]$ is $A_{righteye}$ and the angle is $\theta_{righteye}$. Given that the size of the area is M×M, the left eye location is estimated to be within a specific submatrix. The center of this submatrix is denoted as $[m_c,n_c]$ and is denoted below by the subscript "middle". The line connecting $[m_1,n_1]$ with $[m_c,n_c]$ has angle $\theta_{righteye}$. The distance between $[m_1,n_1]$ and $[m_c,n_c]$ is 2M. The size of the submatrix is M×M.

The left and right eye candidates should satisfy the following criteria in order to be further considered as eye candidates:

$$D(\theta_{lefteye},\theta_{righteye})<15° \quad (18)$$

$$A_{lefteye}<\alpha \cdot A_{middle} \quad (19)$$

$$A_{righteye}<\alpha \cdot A_{middle} \quad (20)$$

$$G_{lefteye}<\beta \cdot G_{middle} \quad (21)$$

$$G_{righteye}<\beta \cdot G_{middle} \quad (22)$$

where $\alpha$ and $\beta$ are parameters determined experimentally.

In prototypes of the present invention, values of $\alpha=2$ and $\beta=7/8$ were found to yield good results, but substantial variation of these parameters is possible without departing from the invention. A left eye candidate is the one that has maximum value of feature amplitude in a window that satisfies the above conditions. The criteria described above are applied to all of the eye candidates identified in 116 at 122 of FIG. 1. The actual location of the left eye is denoted as $[m_2,n_2]$.

Figure 5:
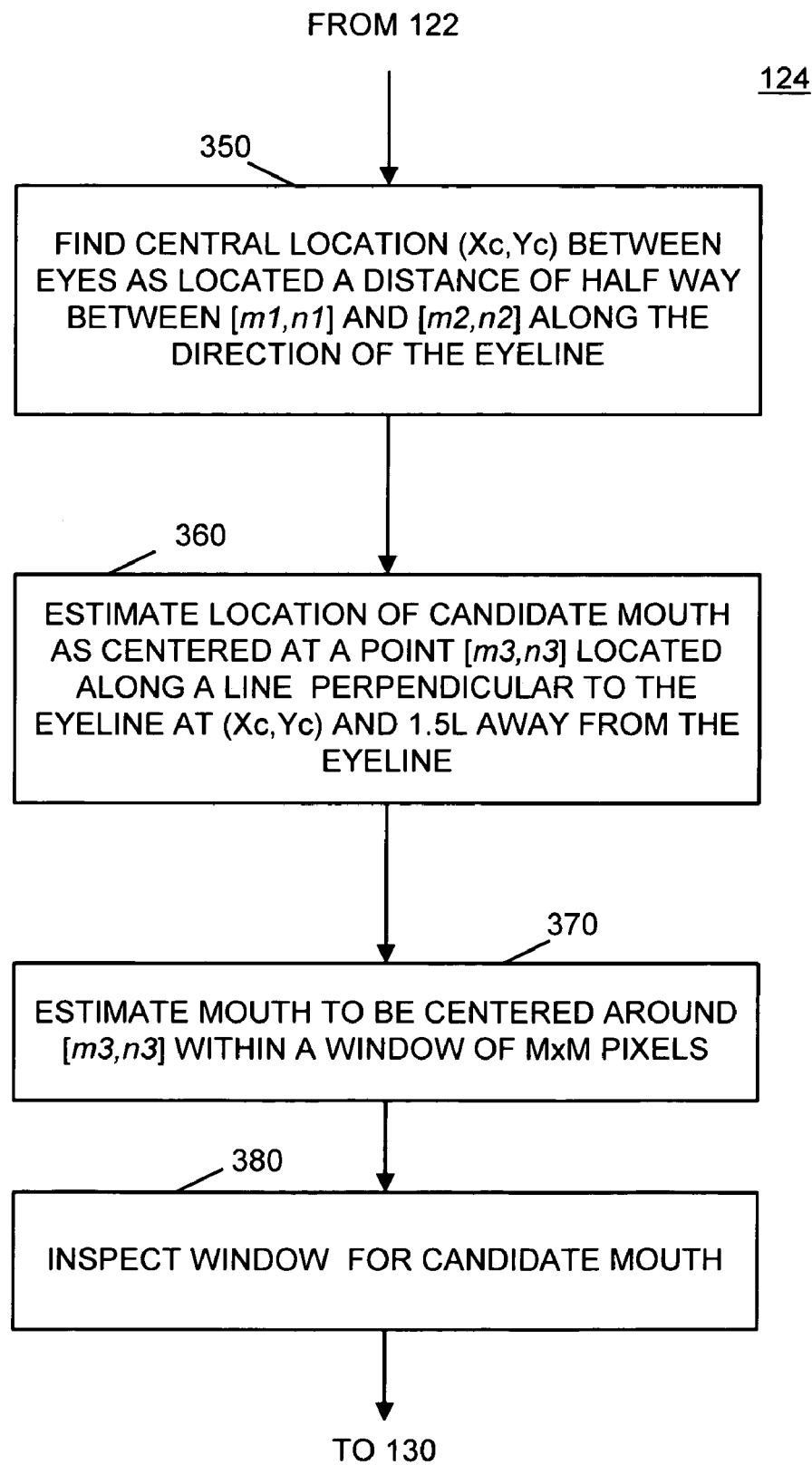
FIG. 5 is a flow chart of a mouth search process consistent with an embodiment of the invention.

Referring now to FIG. 5, process 124 of finding mouth features is described in greater detail. This process is repeated for each set of eyes identified in 116 and 120 above in an attempt to identify associated mouths. At 350, a central location (Xc, Yc) between eye candidates is identified. This location is halfway between $[m_1,n_1]$ and $[m_2,n_2]$ along the line having direction defined by the two eye candidates (e.g., the average direction of the eyes referred to herein as the direction or angle of the eyeline). At 360, the location of the candidate mouth is estimated to be centered at a point $[m_3,n_3]$ located along a line perpendicular to the eyeline and passing through (Xc, Yc) and situated a particular predictable distance away from the eyeline. In the present embodiment, this distance is defined as 1.5 times the length of the eyeline (1.5L), but this is not to be limiting. The mouth is thus estimated at 370 to be centered around $[m_3,n_3]$ within an M×M pixel sub-matrix. At 380, the image is inspected to determine if a candidate mouth exists.

Figure 6:
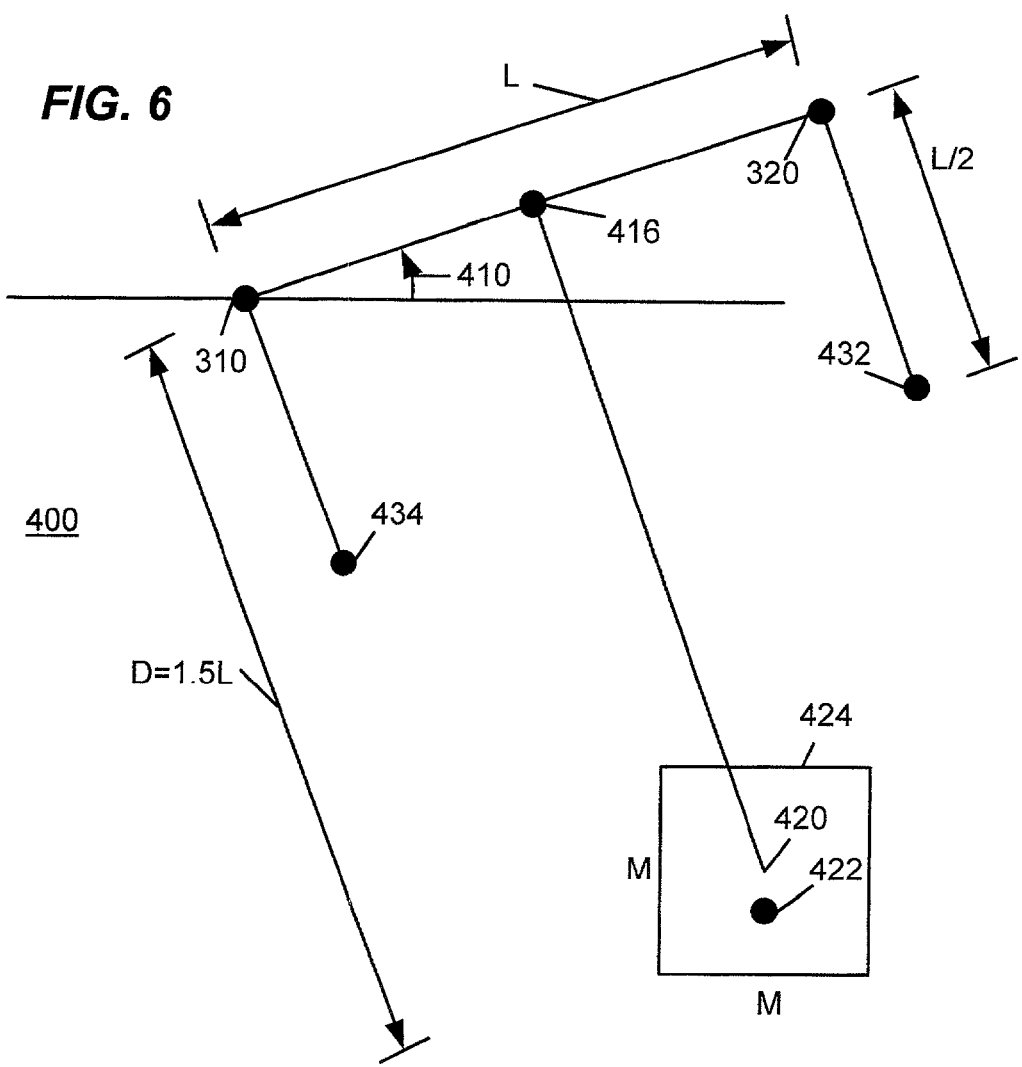
FIG. 6 illustrates the mouth search process of FIG. 5 graphically.

FIG. 6, is an unscaled sketch depicting the mouth identification process in which two candidate eye locations, 310 and 320, are separated by the eyeline distance and are situated along a line having a direction defined by angle 410 connecting the two eye locations (the eyeline). The central point (Xc, Yc) is located at 416 with a candidate mouth being situated at location 420. Location 420 is within an M×M window or sub-matrix 424 located approximately 1.5 times the length of the eyeline (1.5L) from the center of the eyeline at 416.

Mathematically, the mouth can be located as follows:

The angle of the eyeline denoted $\theta_{eyeline}$ is the angle of the line that connects the two eye locations. Suppose the distance between the two eye locations is L. The mouth location can be expected to be in a specific submatrix. The distance between the middle point of the two eye locations and the center of the submatrix can be approximated by 1.5L. The size of the submatrix is M×M.

$$D[\theta eyeline, \theta mouth]<10° \quad (23)$$

$$A_{mouth}>\lambda \cdot (A_{lefteye}+A_{righteye}) \quad (24)$$

$$(G_{mouth}<\gamma \cdot G_{rightface} \text{ and } G_{mouth}<\mu \cdot G_{leftface}) \quad (25)$$

or $$(G_{mouth}<\gamma \cdot G_{leftface} \text{ and } G_{mouth}<\mu \cdot G_{rightface}) \quad (26)$$

Where $G_{leftface}$ and $G_{rightface}$ are the face location points illustrated in FIG. 6 as points 432 and 434 respectively located half the eyeline length (L/2) directly below the eyes along a line perpendicular to the eyeline.

$$G_{lefteye}<\eta \cdot G_{leftface} \quad (27)$$

$$G_{righteye}<\eta \cdot G_{rightface} \quad (28)$$

where $\lambda,\gamma,\mu$, and $\eta$ are parameters determined experimentally.

In a prototype of the present invention: $\lambda=1/8$, $\gamma=8/7$, $\mu=7/8$, and $\eta=7/8$ were found to provide good results, however, substantial variation in these parameters is possible without departing from the invention. The criteria described above are used to evaluate the validity of the identification of the mouth at 130 in FIG. 1.

FIG. 6, is a sketch depicting the mouth identification process in which two candidate eye locations, 310 and 320, are separated by the eyeline distance L and are situated along a line having a direction defined by angle 410 connecting the two eye locations (the eyeline). The central point (Xc,Yc) is located at 416 with a candidate mouth is situated at an M×M submatrix surrounding location 420. Location 420 is the center of the M×M window or sub-matrix 424 located approximately 1.5 times the length of the eyeline (1.5L)

from the center of the eyeline at 416. Point 422 represents a mouth candidate point identified within the submatrix 424.

Referring now to FIG. 7, the process of estimating a face contour, shown as 134 in FIG. 1, is described in greater detail. For each valid set of eyes and mouth identified in 116, 120, 124 and 130, a search is carried out in order to attempt to identify a face contour. This is first accomplished at 450 by constructing an inner ellipse for a lower portion of the face (below the eyeline) and centered at the center point (Xc,Yc) of the eyeline. For the inner ellipse, a vertex is located approximately at the mouth and a covertex is located approximately at the eyes. Those skilled in the art will appreciate that other geometric constructs may also be adapted to this process. Moreover, since the face contour will always reside outside the region of the eyes and the mouth, the exact dimensions of the inner ellipse can be varied accordingly. An outer ellipse is constructed at 458 at a location estimated to be slightly beyond any face contour identified. In the preferred embodiment, an ellipse is constructed for the lower portion of the face.

The outer ellipse is also centered at location (Xc,Yc) with a vertex 1.5 times the mouth distance D=$D_{mouth}$ (the distance from the mouth point 422 to the center of the eyeline) and with covertices located along the eyeline direction of the eyeline distance L from the center point of the eyeline.

It is now possible to sweep around the lower half of the face looking for a face contour residing between the two ellipses. Points on the face contour have a direction similar to the direction of the ellipses. According to one method for identifying these points, a line is constructed from the center point (Xc,Yc) to the outer ellipse. Points between the two ellipses are in inspected to see if they have a direction similar to the direction of each ellipse at the point intersected by the line. 281 That is, lines tangent to the ellipse and the candidate facial edge contour point should have a direction differing by no more than a predetermined amount (30 degrees in the preferred embodiment). To accomplish this, an angle and a count are set to 0 at 466. The line is constructed at the eyeline angle plus theta at 472 and points between the two ellipses are inspected to determine if their direction meets an amplitude threshold and has a difference in angle of less than 30 degrees between the angle at the tangent point in the two ellipses.

If a point is found at 478, the counter is incremented indicating that a potential valid face contour point has been found at 486. Whether a point is found or not, the angle is inspected at 492 to determine if it's equal to 180 degrees. If not, the angle is incremented by a small amount (for example, 1 degree) and a new line is constructed at 472 to repeat the process. Once an angle of theta=180 degrees has been reached, it can be determined from the count whether or not a valid face contour has been identified. In a prototype of the preferred embodiment, it was found that identifying more than 60 points that meet the criteria is adequate to make the assumption that a face contour has been identified. In other embodiments, the angle criteria could be varied, for example, from less than about 20 degrees to less than about 40 degrees with the threshold and angular increment varied accordingly and determined experimentally.

In mathematical terms, two ellipses can be used to estimate a face contour. Any point on the face contour should be between those two ellipses. Suppose the center of two eye locations is ($x_c, y_c$) and the distance between the two eye locations is $2r_{eyes}$. Then the parameter equations for the two ellipses are given by:

$$\begin{cases} x = r_{eyes}\cos(\theta + \theta_{eyeline}) + x_c \\ y = D_{mouth}\sin(\theta + \theta_{eyeline}) + y_c \end{cases} \quad (29)$$

$$\begin{cases} x = 2r_{eyes}\cos(\theta + \theta_{eyeline}) + x_c \\ y = 1.5D_{mouth}\sin(\theta + \theta_{eyeline}) + y_c \end{cases} \quad (30)$$

If a line is drawn from the center of the ellipse to the outer ellipse, this line is expected to cross the face contour. The angle at the cross point in A[m,n] is denoted by $\theta_{face}$. The angle of the tangent line of the ellipse at this point is $\theta_{ellipse}$. $\theta_{face}$ and $\theta_{ellipse}$ should satisfy:

$$D(\theta_{face}, \theta_{ellipse}) < 30° \quad (31)$$

The existence of the face contour can be determined by evaluating equation (31) for values of a from θ to 180 degrees in small increments (e.g. one degree increments). If the number of detected points on the face contours exceeds a specified threshold, then the face contour is considered to exist.

Figure 8:
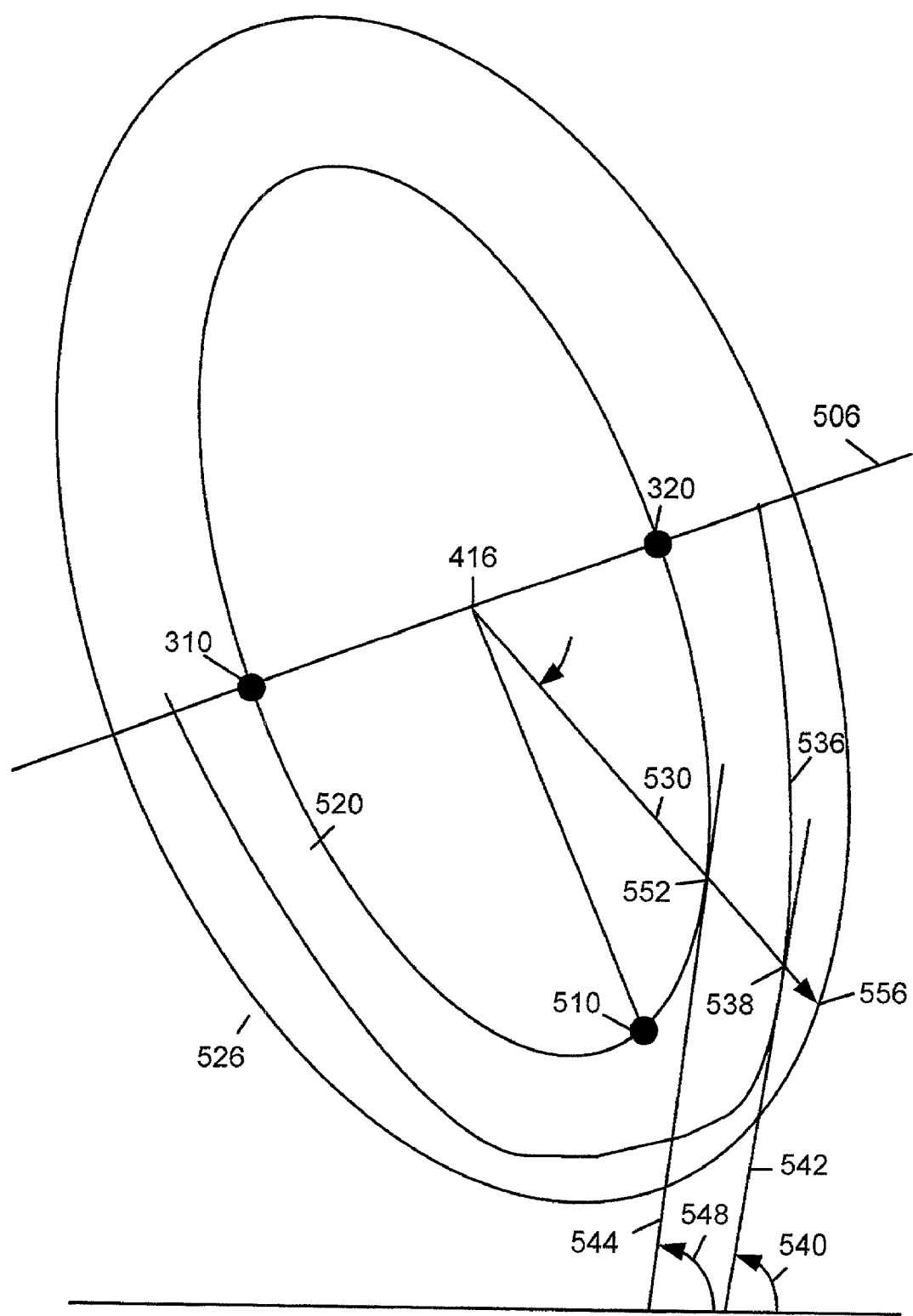
FIG. 8 illustrates the face contour location process of FIG. 7 graphically.

With reference to FIG. 8 (not to scale), a better feel for the process of face contour estimation can be appreciated. Eye locations 310 and 320 along with the center point 416 are situated along the eyeline 506. The mouth is situated at 510. In order to carry out the process of this invention, an inner ellipse 520 is constructed about center point 416. An outer ellipse 526 is similarly constructed about center point 416. A line 530 is constructed between the center point 416 and the outer ellipse 526 starting at the right side of the illustration along the eyeline. Of course in other embodiments the line could be constructed starting at left and swept to the right without departing from the invention.

A face contour 536 is estimated by looking at points along line 530 between inner ellipse 520 and outer ellipse 526. The points between the two ellipses have a direction associated with the point. For example, point 538 has a direction 540 shown by constructing a tangent line 542 passing through point 538. A similar tangent line 544 represents the direction 548 of ellipse 520 at point 552. A similar direction can be identified for point 556 on the outer ellipse. In order to meet the criterion of being a part of the face contour, the direction of point 538 should be relatively close to the direction of points 552 and 556. It has been experimentally determined that a difference of 30 degrees from either of these ellipses is a reasonable criteria for a face contour. However, it is recognized that only a portion of the face contour will meet this criteria. Thus, if more than a predetermined number of points meet the criteria, a facial contour is deemed to exist.

Figure 9:
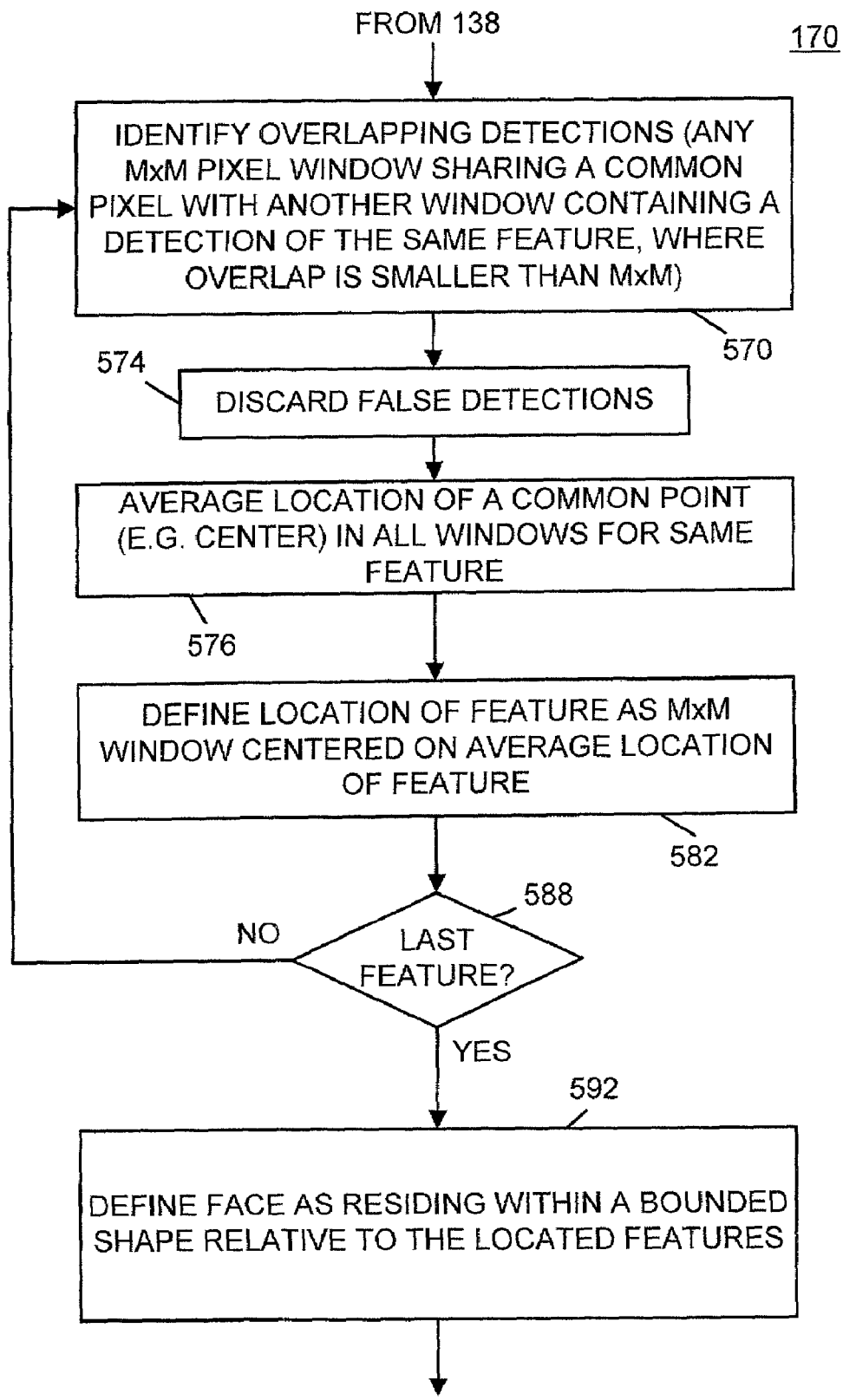
FIG. 9 is a flow chart of a detection merge process consistent with an embodiment of the present invention.

The merging of overlapping face detections of process 170 of FIG. 1 is described in greater detail in connection with FIG. 9. A face is detected if eyes, mouth and face contour are all detected. For a single face, there are generally more significantly more than one overlapping detected face location for each face. These overlapping face candidates can be merged into one face candidate. Two face candidates overlap if the distance of the locations of the same eye on those two face candidates is smaller than the feature size. According to the present embodiment, the number of overlapping detections at each potential face location is counted. If this number exceeds a specific threshold (for example five overlaps), it is considered a detected face. Otherwise, too few detections indicate that it is a "false detection". Two face candidates may be partially overlapped due to the false detection of facial features. In this situation, the process takes the one that has larger number of overlapping detections. For example, the method may erroneously detect a right ear and right eye as left and right eyes. In this case, the larger number of overlapping detections determines the correct detection.

The process can be described as starting with identifying any overlapping detections at 570. Overlapping detections are those detections which show at least one common pixel with another detection, that is, if two sub-matrices or any given feature overlap. However, the overlap should be no larger than the estimated feature size (M×M). At 574, if a detection has less than a threshold number (five worked well in the prototype) of overlapping detections, it is presumed to be a false detection and is discarded. At 576, the average location for a common point of reference of all of the overlapping detections is identified. This can be accomplished by simply averaging the location of those points or can alternatively be handled by any other suitable "location averaging type operation". One example of an alternative might be to identify the centroid of the region covered by all pixels in all overlapping detections. Once this central or average location is identified, the feature can be defined as residing within a M×M window centered on the average location of the feature at 582. If the last feature has not been reached at 588, the process repeats itself returning to 570 until all features have been merged. Once the last feature has been identified at 588, the face can be defined as residing within some bounded shape relative to the located features at 592.

The output at this point depends upon what the ultimate use of the face detection is to be. By way of example and not limitation, simply the location of the features can be output or any one or more of the features can be output. In other examples, a geometric pattern can be constructed around the features (for example, the facial features identified can be enclosed within a rectangle or within a circle or an ellipse). In another example, the face contour can be used to approximate a curve to define an outline for the entire face, or lower portion thereof. Other examples will occur to those skilled in the art depending upon the use that face location is ultimately destined.

As previously described, the process above can be utilized to detect faces under varying scales and varying rotation of the features. This ability renders the current process useful in detecting a wide variety of faces under many circumstances without being hindered by lighting or rotation of the face or size of the face in proportion to the total image. The resizing process described in connection with FIG. 1 at 150 and 154 accounts for a wide range of variation in image sizes. In tests conducted using the method provided above, the faces were accurately detected in images ranging in size from several hundred pixels in each dimension to several thousand pixels in each dimension. In so doing, the process started out with an assumption that the features being sought were approximately 10 pixels by 10 pixels (M×M) in size. After an iteration of the above detection process, the size of the image (not the sub-matrix) was adjusted by reducing each size by a factor of 2. The reduced size image was created by averaging the value of adjacent pixels to come up with the reduced size image. That is, the average of a 2×2 pixel square was used to create the reduced image size pixel. The process was then repeated and thus equivalently revises the estimated feature size (M×M) for the next search. The process repeats until the image is reduced to 20×20 or below rendering it too small to detect a face.

First the facial feature size is estimated. Then the face detection algorithm is applied to the original size image. In order to detect different faces with different scales, the image is repeatedly shrink by half vertically and horizontally and the face detection algorithm is applied to the resized image.

Figure 10:
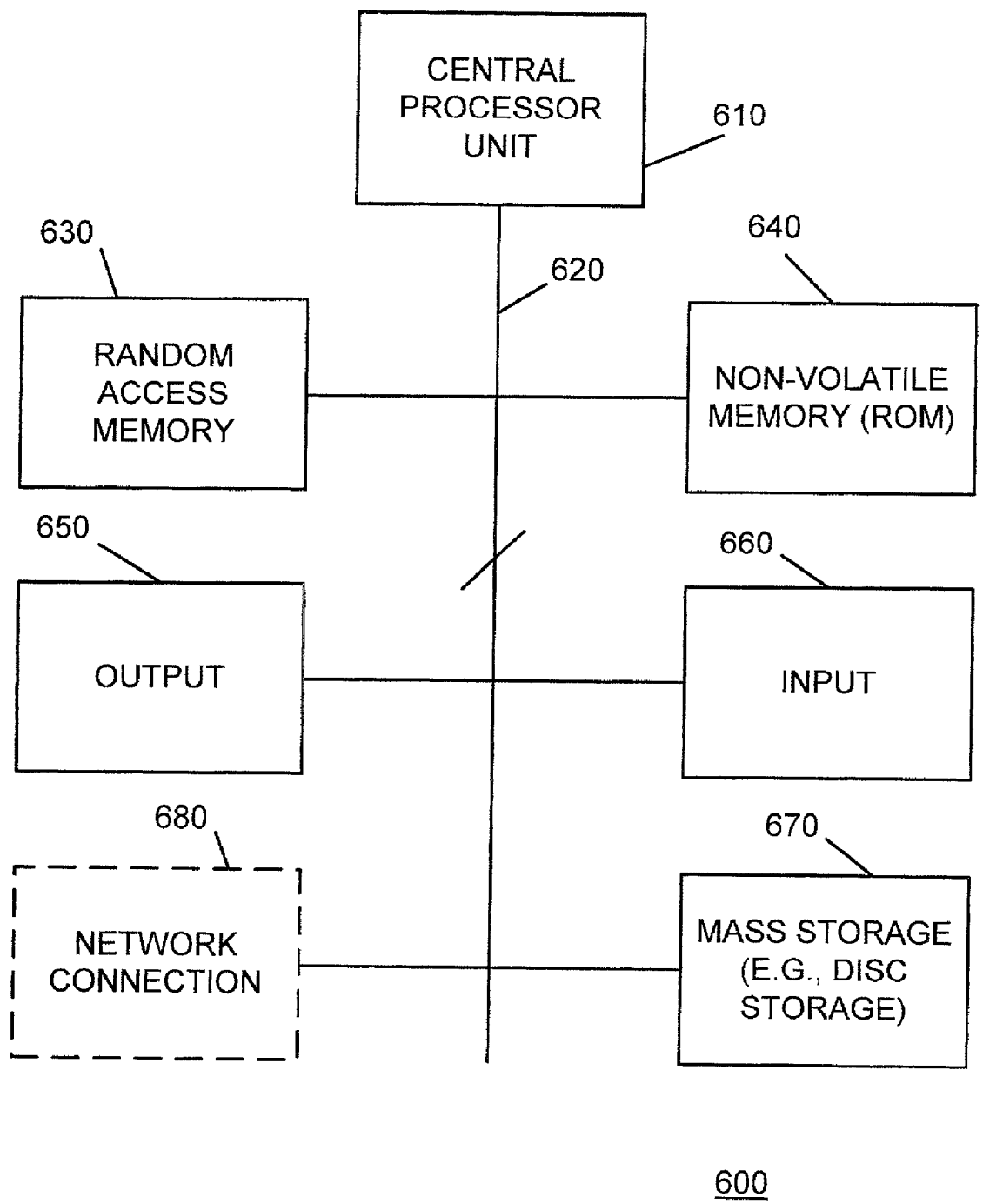
FIG. 10 is a block diagram of a computer system suitable for carrying out the process according to the present invention.

The process of the present invention can be carried out by a general purpose computing system such as 600 shown in FIG. 10. Such computing system includes a central processor 610 connected to a system bus 620 that provides the central processing unit with access to random access memory 630 and non-volatile memory 640. Any suitable output mechanism 650 and input device 650 such as monitor, keyboard and other well-known output and input devices are also coupled to system bus 620. Central processing unit 610 also accesses mass storage devises such as hard disc, floppy disc and optical storage devices 670 via the system bus 620. The system may also include a network connection 680 or other standard devices as may be appropriate to the final application of the invention. For example, in addition to the devices shown, or in place of some devices, the image may be directly captured by a camera that ultimately feeds an image file to the central processor. Program instructions defining the process of the present invention can be stored in mass storage 670 or non-volatile storage 640 for transfer to random access memory 630 for processing images. The face detected can then be output to any suitable device or program.

Figure 11:
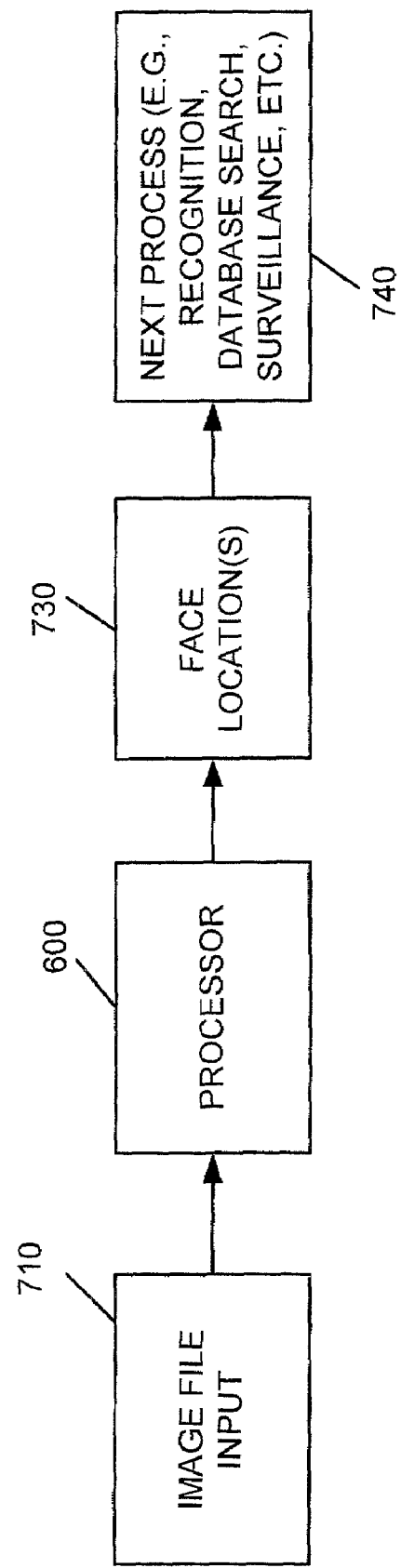
FIG. 11 is a block diagram showing a face detection system overview.

An overview of a process 700 of using the present invention is illustrated in FIG. 11 wherein an image file input 710 is processed by a processor system 600 such as that of FIG. 10 and face locations are output at 730. The face locations are provided to another process at 740 such as face recognition, data base searches, surveillance applications, etc. Many variations to the present invention are possible without departing from the invention. For example, although the process was illustrated as first finding a right eye and then a left eye, it can be done in the reverse order first finding the left eye and then the right eye. Moreover, rather than first searching for eyes, the mouth could be searched for first with the location of the eyes following. Low pass filtering 114 provides greater noise immunity to the process, but could be omitted without departing from the invention. The exact experimental values identified while quite functional may not be optimized and can readily be varied without departing from the invention. Moreover, the assumed image size of 10×10 pixels and the reduction factor for images as shown in 154 of FIG. 1 can be varied and/or optimized. In another variation, the assumed feature size can be varied rather than the image size.

Figure 14:
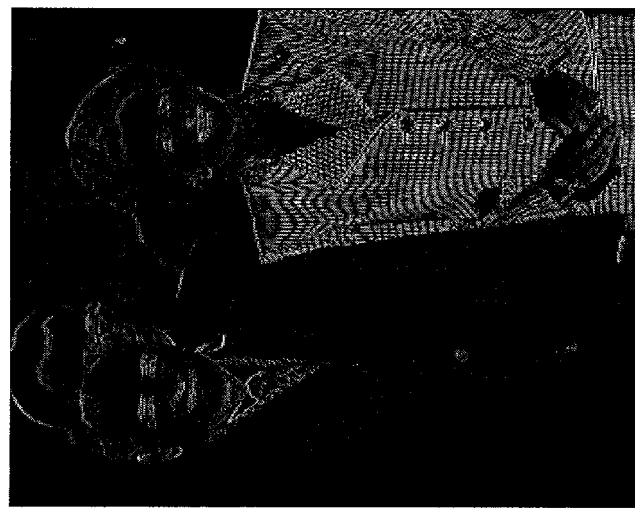
FIG. 14 is an exemplary image of the magnitude of the $I_y$ component of the image of FIG. 12.
Figure 13:
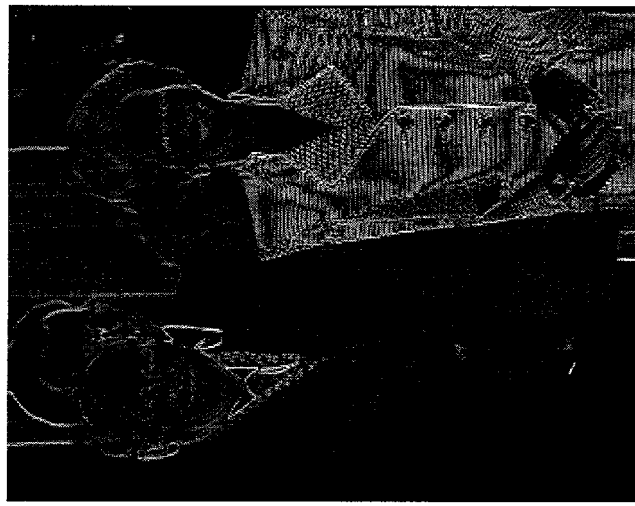
FIG. 13 is an exemplary image of the magnitude of the $I_x$ component of the image of FIG. 12.
Figure 12:
FIG. 12 is an exemplary starting image.
Figure 17:
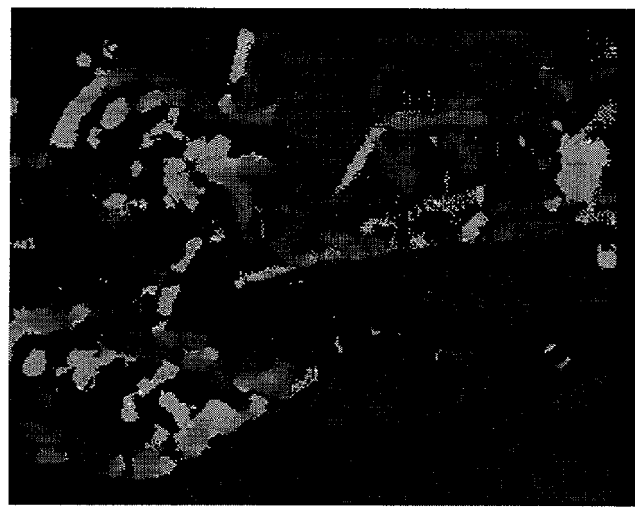
FIG. 17 is an exemplary global angle image created from the starting image of FIG. 15.
Figure 16:
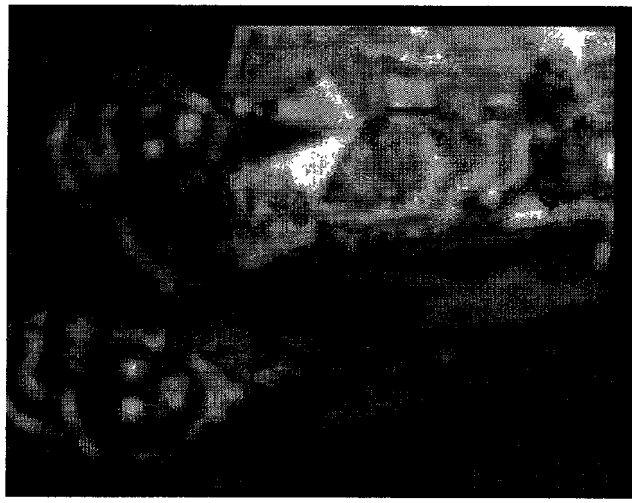
FIG. 16 is an exemplary global amplitude image created from the starting image of FIG. 15.
Figure 15:
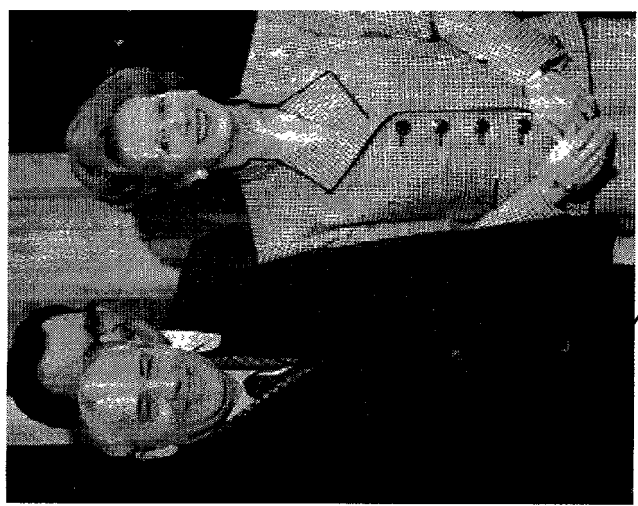
FIG. 15 is an exemplary starting image.
Figure 19:
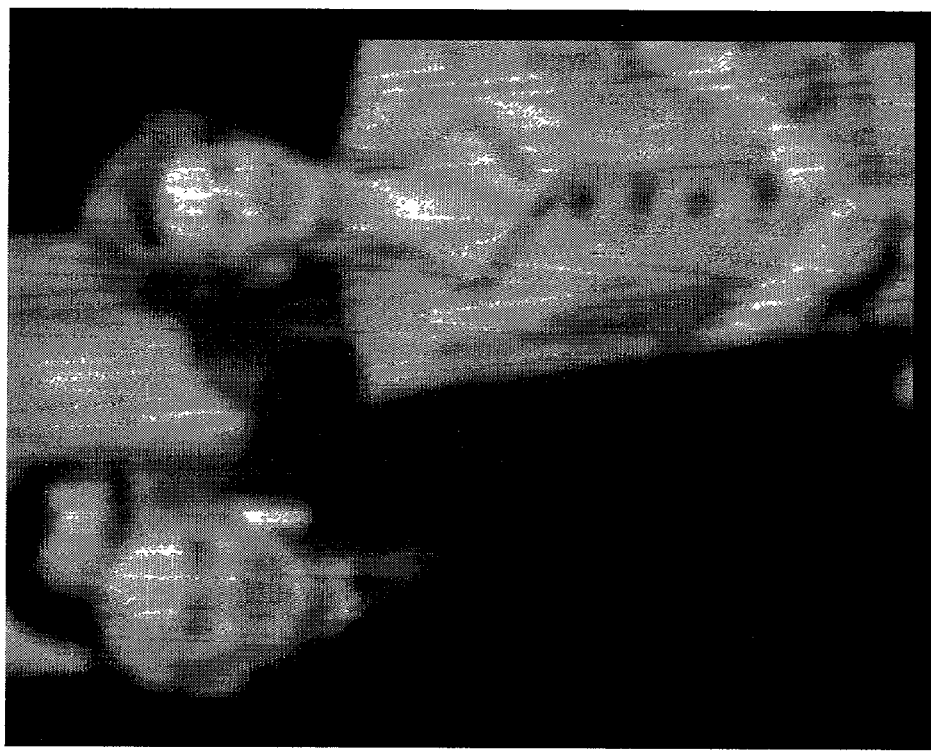
FIG. 19 is an exemplary low pass filtered image created from the starting image of FIG. 18.
Figure 18:
FIG. 18 is an exemplary starting image.
Figure 21:
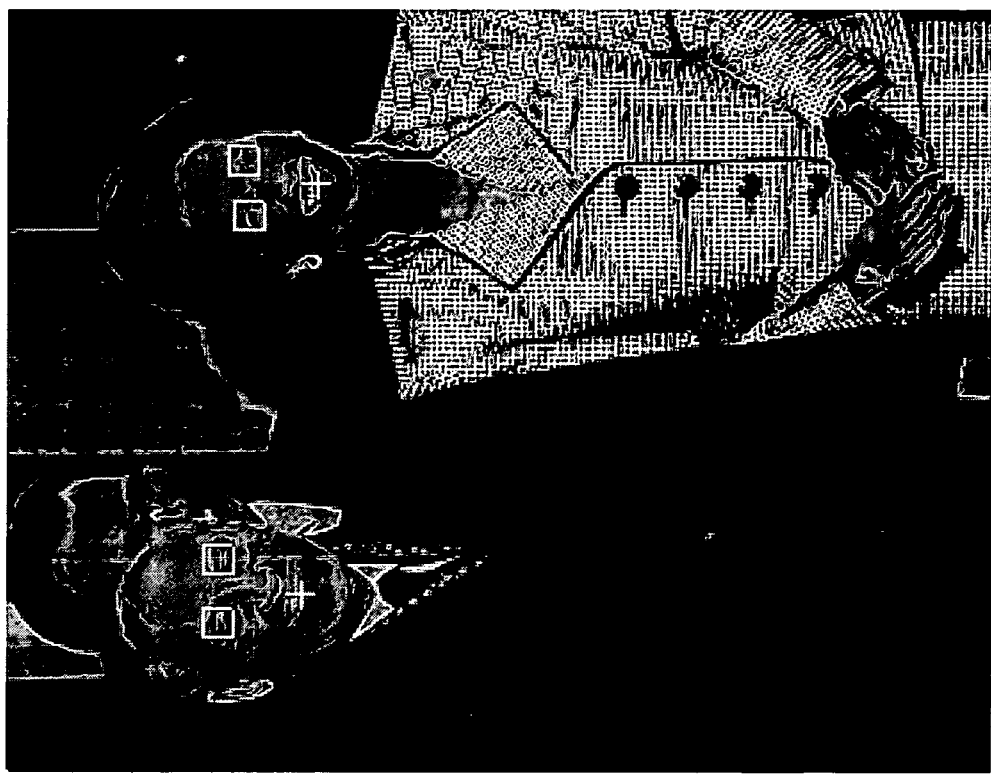
FIG. 21 is an exemplary image with overlapping detections of FIG. 20 merged into a single detection.
Figure 20:
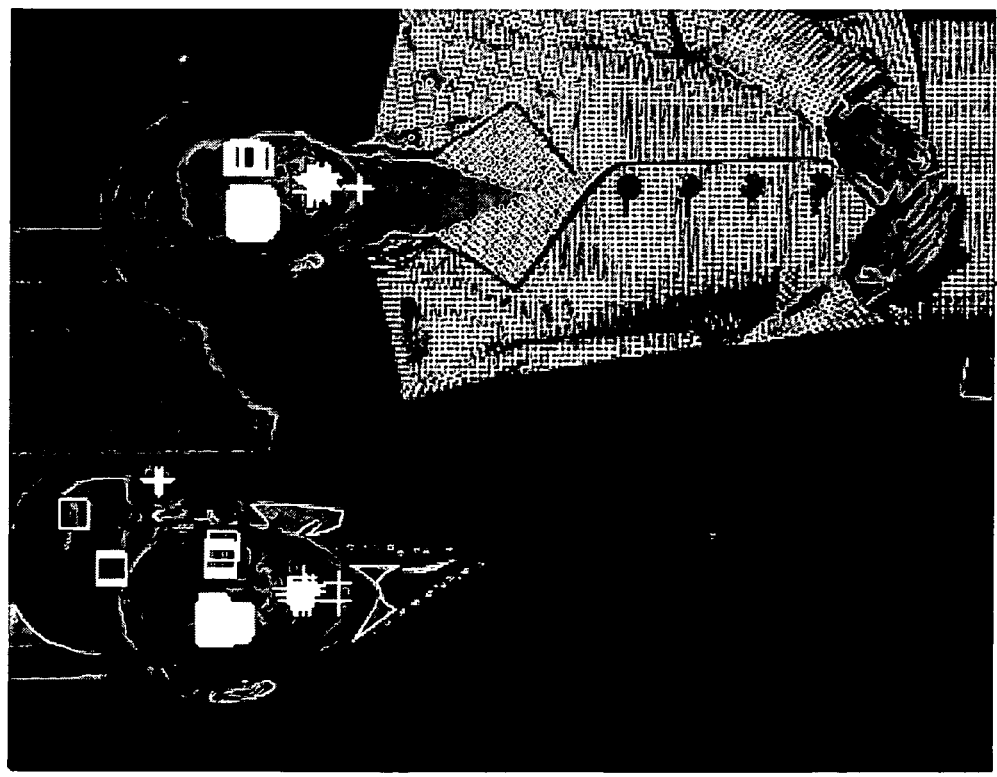
FIG. 20 is an exemplary image showing overlapping detections.

Referring now to FIGS. 12–21, various image files are represented to illustrate the various operations of the current invention. Image 810 of FIG. 12 is an example of a starting image having two full faces and one partial face, Image 820 of FIG. 13 represents the magnitude of the horizontal difference $I_x$. Image 830 of FIG. 14 represents the magnitude of the vertical difference $1_y$. The starting image is again illustrated in FIG. 15 as 840. The global direction amplitude A is illustrated as 850 of FIG. 16 while the global direction angle theta is illustrated as 860 of FIG. 17. The input image 870 of FIG. 18 is illustrated alongside the low pass filtered output (G) image 880 of FIG. 19. It is noted that images 850, 860 and 880 each include a band at the lower edge and right edge of the image but is discarded to create the image. FIG. 20 shows an image 890 in which a plurality of candidate faces are shown to overlap. In this image, the candidate faces are located by rectangles about the eye locations an + signs about the mouth location. In other embodiments, the face could be bounded by any suitable geometric construct. FIG. 21 shows an image 895 wherein the same boundary of a rectangle around the eyes and + sign at the mouth is shown to illustrate the detection of the two full faces. The partial face is eliminated from this detection as a false detection since fewer than the minimum required overlapping face detections were present.

Thus, a new efficient and rapid technique which is feature-based has been described. It detects face features based on intensity, so it also works on black and white (gray scale) images. The rotation of the facial features is determined based on the edge information. Therefore, templates for different angles are not necessary. This technique can efficiently detect human faces under a wide range of luminance conditions, head orientation, scale, and rotation.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of detecting a face in a matrix of pixels representing an image, the method comprising:
   computing a vector having amplitude and direction for each of a plurality of sub-matrices, the sub-matrices having size estimated to be a facial feature size in the image;
   inspecting each sub-matrix to determine if the amplitude exceeds a threshold, wherein sub-matrices having amplitude exceeding the threshold are deemed facial feature candidate sub-matrices;
   wherein, upon establishing a first facial feature candidate sub-matrix, a second facial feature candidate sub-matrix is assumed to lie in a direction determined by the vector direction of the first facial feature candidate sub-matrix;
   establishing a matching distance and angle criteria for relationships among each of the first and second candidate sub-matrices and a third facial feature candidate submatrix; and
   identifying sets of candidate sub-matrices matching the distance and angle criteria to detect the presence of a face in the image.

2. The method according to claim 1, further comprising low pass filtering the image prior to the inspecting.

3. The method according to claim 1, wherein a facial feature size is assumed to be M×M pixels.

4. The method according to claim 1, wherein a first facial feature candidate includes a first eye, and wherein the second candidate facial feature includes a second eye, and wherein the second eye is assumed to be located approximately two feature sizes away from the first eye along the vector direction of the first facial feature candidate sub-matrix.

5. The method according to claim 3, wherein a facial feature candidate includes a first eye, and wherein a candidate for a second eye is assumed to be located approximately 2M away along a direction determined by the candidate first eye.

6. The method according to claim 4, wherein the third facial feature candidate includes a mouth, and wherein the mouth is assumed to be located approximately 3 feature sizes away from a center point between the two candidate eyes in a direction perpendicular to a direction defined by a line between the two candidate eyes.

7. The method according to claim 5, further comprising computing an eyeline distance L between the two candidate eyes.

8. The method according to claim 7, wherein the third facial feature candidate includes a mouth, and wherein the mouth is assumed to be located approximately 1.5L away from a center point between the two candidate eyes in a direction perpendicular to a direction defined by a line between the two candidate eyes.

9. The method according to claim 6, wherein a fourth facial feature candidate includes a face contour, and wherein:
   the facial contour is assumed to be located between an inner and an outer ellipse, the inner and outer ellipses being centered at approximately the center point between the two candidate eyes; and
   the inner ellipse having a vertex at approximately the location of the mouth candidate and covertices at approximately the candidate eyes.

10. The method according to claim 9, wherein the outer ellipse has a vertex at approximately 1.5 times the distance from the candidate mouth to the center point between the two candidate eyes and covertices at approximately equaling the distance between the two candidate eyes from the center point between the two candidate eyes, the vertex and covertices of the two ellipses being aligned.

11. The method according to claim 8, wherein a fourth facial feature candidate includes a face contour, and wherein:
   the facial contour is assumed to be located between an inner and an outer ellipse, the inner and outer ellipses being centered at approximately the center point between the two candidate eyes; and the inner ellipse having a vertex at approximately the location of the mouth candidate and covertices at approximately the candidate eyes.

12. The method according to claim 11, wherein the outer ellipse has a vertex at approximately 1.5 times the distance from the center point between the two candidate eyes and the candidate mouth and covertices at approximately two times the feature size, the vertex and covertices of the two ellipses being aligned.

13. The method according to claim 1, further comprising determining that a plurality of sets of overlapping faces are detected, and merging the overlapping detections by finding an average location of the overlapped faces and defining a detected face as residing at the average location.

14. The method according to claim 1, further comprising:
resizing the matrix of pixels defining the image; and
repeating the computing, inspecting, establishing and identifying on the resized matrix of pixels.

15. The method according to claim 1, wherein the amplitude comprises a feature amplitude value.

16. A computer readable medium storing computer program which, when executed on a programmed processor, carry out a method of detecting a face in a matrix of pixels representing an image, the method comprising:
computing a vector having amplitude and direction for each of a plurality of sub-matrices, the sub-matrices having size estimated to be a facial feature size in the image;
inspecting each sub-matrix to determine if the amplitude exceeds a threshold, wherein sub-matrices having amplitude exceeding the threshold are deemed facial feature candidate sub-matrices;
wherein, upon establishing a first facial feature candidate sub-matrix, a second facial feature candidate sub-matrix is assumed to lie in a direction determined by the vector direction of the first facial feature candidate sub-matrix;
establishing a matching distance and angle criteria for relationships among each of the first and second candidate sub-matrices and a third facial feature candidate submatrix; and
identifying sets of candidate sub-matrices matching the distance and angle criteria to detect the presence of a face in the image.

17. The computer readable medium according to claim 16, further comprising low pass filtering the image prior to the inspecting.

18. The computer readable medium according to claim 17, wherein a facial feature size is assumed to be M×M pixels, and wherein the first facial feature candidate includes a first eye, and wherein a candidate for a second eye is assumed to be located approximately two feature sizes away along a direction determined by the first eye candidate.

19. The computer readable medium according to claim 18, wherein the third facial feature candidate includes a mouth, and wherein the mouth is assumed to be located a predetermined distance away from a center point between the two candidate eyes in a direction perpendicular to a direction defined by a line between the two candidate eyes.

20. The computer readable medium according to claim 19, wherein a fourth facial feature candidate includes a face contour, and wherein:
the facial contour is assumed to be located between an inner and an outer ellipse, the inner and outer ellipses being centered at approximately the center point between the two candidate eyes; and
the inner ellipse having a vertex at approximately the location of the mouth candidate and covertices at approximately the candidate eyes.

21. The computer readable medium according to claim 20, further comprising determining that a plurality of sets of overlapping faces are detected, and merging the overlapping detections by finding an average location of the overlapped faces and defining a detected face as residing at the average location.

22. The computer readable medium according to claim 16, wherein the amplitude comprises a feature amplitude value.

23. A face detection apparatus for detecting a face in a matrix of pixels representing an image, comprising:
input means for receiving an input image;
a programmed processor carrying out a process of:
computing a vector having amplitude and direction for each of a plurality of sub-matrices, the sub-matrices having size estimated to be a facial feature size in the image;
inspecting each sub-matrix to determine if the amplitude exceeds a threshold, wherein sub-matrices having amplitude exceeding the threshold are deemed facial feature candidate sub-matrices;
wherein, upon establishing a first facial feature candidate sub-matrix, a second facial feature candidate sub-matrix is assumed to lie in a direction determined by the vector direction of the first facial feature candidate sub-matrix;
establishing a matching distance and angle criteria for relationships among each of the first and candidate sub-matrices and a third facial feature candidate submatrix ; and
identifying sets of candidate sub-matrices matching the distance and angle criteria to detect the presence of a face in the image.

24. The apparatus according to claim 23 further comprising a low pass filter that filters the input image prior to the inspecting.

25. The apparatus according to claim 23, wherein the first feature candidate includes a first eye, and wherein a candidate for a second eye is assumed to be located approximately two feature sizes away along the vector direction of the facial feature candidate sub-matrix.

26. The apparatus according to claim 25, wherein a fourth facial feature candidate includes a mouth, and wherein the candidate mouth is assumed to be located approximately 3 feature sizes away from a center point between the two candidate eyes in a direction perpendicular to a direction defined by a line between the two candidate eyes.

27. The apparatus according to claim 25, wherein a fourth facial feature candidate includes a mouth, and wherein the mouth is assumed to be located approximately 1.5 times the distance between the two candidate eyes away from a center point between the two candidate eyes in a direction perpendicular to a direction defined by a line between the two candidate eyes.

28. The apparatus according to claim 27, wherein a fifth facial feature candidate includes a face contour, and wherein:
the facial contour is assumed to be located between an inner and an outer ellipse, the inner and outer ellipses being centered at approximately the center point between the two candidate eyes; and
the inner ellipse having a vertex at approximately the location of the mouth candidate and covertices at approximately the candidate eyes.

29. The apparatus according to claim 27, wherein the outer ellipse has a vertex at approximately 1.5 times the distance from the candidate mouth to the center point between the two candidate eyes and covertices at approximately equaling the distance between the two candidate eyes from the center point between the two candidate eyes, the vertex and covertices of the two ellipses being aligned.

30. The apparatus according to claim 29, wherein a facial feature candidate includes a face contour, and wherein:
the facial contour is assumed to be located between an inner and an outer ellipse, the inner and outer ellipses being centered at approximately the center point between the two candidate eyes; and
the inner ellipse having a vertex at approximately the location of the mouth candidate and covertices at approximately the candidate eyes.

31. The apparatus according to claim 30, wherein the outer ellipse has a vertex at approximately 1.5 times the distance from the center point between the two candidate eyes and the candidate mouth and covertices at approximately two times the feature size, the vertex and covertices of the two ellipses being aligned.

32. The apparatus according to claim 23, wherein the processor further determines that a plurality of sets of overlapping faces are detected, and merging the overlapping detections by finding an average location of the overlapped faces and defining a detected face as residing at the average location.

33. The apparatus according to claim 23, wherein the processor further carries out a process of:
resizing the matrix of pixels defining the image; and
repeating the computing, inspecting, establishing and identifying on the resized matrix of pixels.

34. The apparatus according to claim 23, wherein the amplitude comprises a feature amplitude value.

35. A method of face detection in an image, comprising:
identifying a first candidate facial feature with a feature size;
computing a first direction associated with the first candidate facial; and
searching for a second candidate facial feature at a first location determined at least in part by the first direction.

36. The method according to claim 35, further comprising:
finding the second candidate facial feature;
computing a geometric relationship between the first facial feature and the second feature, the geometric relationship including a second direction; and
searching for a third candidate facial feature at a third location determined by the geometric relationship including the second direction.

37. The method according to claim 36, further comprising:
finding the third candidate facial feature;
creating a bounded geometric construct about the first, second and third features; and
searching for a facial contour within the bounds of the geometric construct.

38. The method according to claim 35, wherein the first and second candidate facial features comprise first and second eyes.

39. The method according to claim 35, wherein the first candidate facial feature comprises an eye and wherein the first direction comprises an eye direction.

40. The method according to claim 36, wherein the first and second candidate facial features comprise first and second candidate eyes, and wherein the geometric relationship includes an eyeline having length L equaling a distance between the first and second candidate eyes, and wherein the second direction comprises a direction of the eyeline.

41. The method according to claim 40, wherein the third candidate facial feature comprises a candidate mouth, and wherein the third location is situated a predetermined distance from the eyeline along a line perpendicular to the eyeline and passing through a center of the eyeline.

42. The method according to claim 37, wherein the bounded geometric construct comprises an inner and an outer ellipse, and wherein searching comprises searching for the facial contour between the inner and outer ellipse.

43. The method according to claim 42, wherein the searching further comprises searching for points between the inner and outer ellipse that have direction within a specified angle of tangent angles of the inner and outer ellipses.

44. The method according to claim 35, wherein the identifying comprises finding dark regions of the image.

45. The method according to claim 36, wherein the first and second candidate eyes are tested against the following criteria to determine that they are eye candidates:

$$D(\theta_{lefteye}, \theta_{righteye}) < 15°;$$

$$A_{lefteye} < \alpha \cdot A_{middle};$$

$$A_{righteye} < \alpha \cdot A_{middle};$$

$$G_{lefteye} < \beta \cdot G_{middle};$$

$$G_{righteye} < \beta \cdot G_{middle};$$

where D is the distance function, $\theta$ is an angle defining the direction, A is an amplitude of the candidate feature, G is a low pass filtered amplitude, and $\alpha$ and $\beta$ are constants, and wherein the subscript middle denotes quantities associated with a midpoint between the two eyes.

46. The method according to claim 45, wherein $\alpha$ is approximately equal to 2 and $\beta$ is approximately equal to 7/8.

47. The method according to claim 40, wherein the first and second candidate eyes and the candidate mouth are tested against the following criteria to determine that they are eye candidates and mouth candidate:

$$D[\theta eyeline, \theta mouth] < 10°$$

$$A_{mouth} > \lambda \cdot (A_{lefteye} + A_{righteye});$$

$$(G_{mouth} < \gamma \cdot G_{rightface} \text{ and } G_{mouth} < \mu \cdot G_{leftface})$$

or $$(G_{mouth} < \gamma \cdot G_{leftface} \text{ and } G_{mouth} < \mu \cdot G_{rightface});$$

$$G_{lefteye} < \eta \cdot G_{leftface};$$

$$G_{righteye} < \eta \cdot G_{rightface};$$

where $G_{leftface}$ and $G_{rightface}$ are face location points located L/2 directly below the eyes along a line perpendicular to the eyeline and where $\lambda, \gamma, \mu,$ and $\eta$ are constants.

48. The method according to claim 47, wherein $\lambda$ is approximately 1/8, $\lambda$ is approximately 8/7, $\mu$ is approximately 7/8 and $\eta$ is approximately 7/8.

49. The method according to claim 43, a center point of the eyeline is $(x_c, y_c)$ and the distance between the two eyes is $2r_{eyes}$ and wherein the inner ellipses are given by:

$$\begin{cases} x = r_{eyes}\cos(\theta + \theta_{eyeline}) + x_c \\ y = D_{mouth}\sin(\theta + \theta_{eyeline}) + y_c \end{cases};$$

and wherein the outer ellipse is given by:

$$\begin{cases} x = 2r_{eyes}\cos(\theta + \theta_{eyeline}) + x_c \\ y = 1.5 D_{mouth}\sin(\theta + \theta_{eyeline}) + y_c \end{cases};$$

wherein, if a line is drawn from the center of the ellipse to the outer ellipse, this line is expected to cross the candidate face contour.

50. The method according to claim 49, wherein candidate points on the candidate face contour are expected to meet the criterion of:

$$D(\theta_{face}, \theta_{ellipse}) < 30°$$

where D is the distance function, the angle the face contour where the line crosses is denoted by $\theta_{face}$ and the angle of the tangent line of the ellipse at the point where the line crosses $\theta_{ellipse}$.

51. The method according to claim 50, further comprising counting a number of points meeting the criterion and comparing the number to a threshold to determine existence of a face contour.

52. A method of detecting a face in a matrix of pixels representing an image, the method comprising:

computing a vector having amplitude and direction for each of a plurality of sub-matrices, the sub-matrices having size estimated to be a facial feature size in the image;

inspecting each sub-matrix to determine if the amplitude exceeds a threshold, wherein sub-matrices having amplitude exceeding the threshold are deemed facial feature candidate sub-matrices;

wherein, upon establishing a first facial feature candidate sub-matrix, a second facial feature candidate sub-matrix is assumed to lie in a direction determined by the vector direction of the first facial feature candidate sub-matrix;

wherein the second facial feature candidate sub-matrix has a vector direction substantially equal to the direction of the first facial feature candidate sub-matrix vector direction plus 180 degrees;

establishing a matching distance and angle criteria for relationships between each of the first and second candidate sub-matrices and a third facial feature candidate submatrix; and identifying sets of candidate sub-matrices matching the distance and angle criteria to detect the presence of a face in the image.

53. A method of detecting a face in a matrix of pixels representing an image, the method comprising:

computing a vector having amplitude and direction for each of a plurality of sub-matrices, the sub-matrices having size estimated to be a facial feature size in the image;

inspecting each sub-matrix to determine if the amplitude exceeds a threshold, wherein sub-matrices having amplitude exceeding the threshold are deemed facial feature candidate sub-matrices;

wherein, upon establishing a first facial feature candidate sub-matrix, a second facial feature candidate sub-matrix is assumed to lie in a direction determined by the vector direction of the first facial feature candidate sub-matrix, wherein the direction is determined without regard for a horizontal or vertical direction;

establishing a matching distance and angle criteria for relationships between each of the first and second candidate sub-matrices and a third facial feature candidate submatrix; and identifying sets of candidate sub-matrices matching the distance and angle criteria to detect the presence of a face in the image.

* * * * *